July 28, 1964 W. W. HAGUE ETAL 3,142,206
CONTROL SYSTEM FOR IMPACT DEVICE
Filed May 15, 1962 6 Sheets-Sheet 1

INVENTORS:
WILMER W. HAGUE
GLENN A. HOUSEHOLDER
BY
ATTYS.

INVENTORS:
WILMER W. HAGUE
GLENN A. HOUSEHOLDER
ATTYS.

July 28, 1964 W. W. HAGUE ETAL 3,142,206
CONTROL SYSTEM FOR IMPACT DEVICE
Filed May 15, 1962 6 Sheets-Sheet 6

INVENTORS:
WILMER W. HAGUE
GLENN A. HOUSEHOLDER
BY Howson & Howson
ATTYS.

United States Patent Office 3,142,206
Patented July 28, 1964

3,142,206
CONTROL SYSTEM FOR IMPACT DEVICE
Wilmer W. Hague, Fayetteville, and Glenn A. Householder, St. Thomas, Pa., assignors to Chambersburg Engineering Company, Chambersburg, Pa., a corporation of Pennsylvania
Filed May 15, 1962, Ser. No. 196,034
10 Claims. (Cl. 78—13)

This invention relates to a stroke programmer control system for an impact device having means permitting selection of strokes of more than one length.

It has become common in impact devices, such as drop hammers and horizontally opposed ram impacters, to provide more than one stroke length. Means for accomplishing variation in stroke length may take different forms depending on the nature of the machine controlled. For example, a stroke length control for a drop hammer is taught in U.S. Patent 2,604,071 to Paul A. Rickrode, assigned to the assignee of the present invention. Frequently two stroke lengths are provided, but more than two stroke lengths may be provided by a reasonable extension of the known techniques, such as the arrangement shown in the Rickrode patent. In any event, there will be provided at least one stroke length selector means which may have alternate positions for different stroke lengths and there may be separate selector means for each possible stroke length. The nature of the stroke length selector means may vary depending upon the type of impact device employed, as well as the techniques of actuating and operating that device.

For various reasons, a particular pattern or sequence of blows is usually found desirable in connection with work of a given kind. Usually, there are a certain number of blows of one stroke length and then a certain number of blows of another stroke length, etc. Very frequently short strokes precede long strokes but this is not always the case. Whatever preferred pattern of strokes has been selected, it has been necessary, heretofore, once the sequence of blows has been determined for the operator to remember the sequence and "manually" select the length of each stroke. This has been a tedious job and in some instances operators lose count of the precise number of strokes of a given length which have been applied or even the sequence of stroke group if a complicated pattern is involved and thereby depart from the optimum sequence of blows.

In accordance with the present invention, means is provided for programming or pre-selecting the number of blows of a given stroke length in a particular sequence. In some embodiments of the invention, it is even possible to vary the order of stroke length as desired. Once the stroke program is selected the control system, each time it is actuated, and until the programming is changed will cause the controlled impact device to follow its pre-selected program of strokes. In some embodiments the number of strokes of a particular length may be varied in accordance with some variable either as a result of sensing the variable in advance of the impacting or in the course of the impacting.

In accordance with the present invention, the stroke programmer control system consists of counting means for counting strokes of the impact device, at least one means for actuating each of the stroke length selector means and sequencing means responsive to the counting means associated with at least one less than the total number of actuating means to terminate a sequence of strokes of a patricular length at a selected count and initiate a sequence of strokes of another predetermined length.

For a better understanding of the present invention, reference is made to the following drawings in which a pressure fluid actuated gravity drop hammer is shown in connection with the stroke programmer control system of the present invention and in which.

Figure 1:
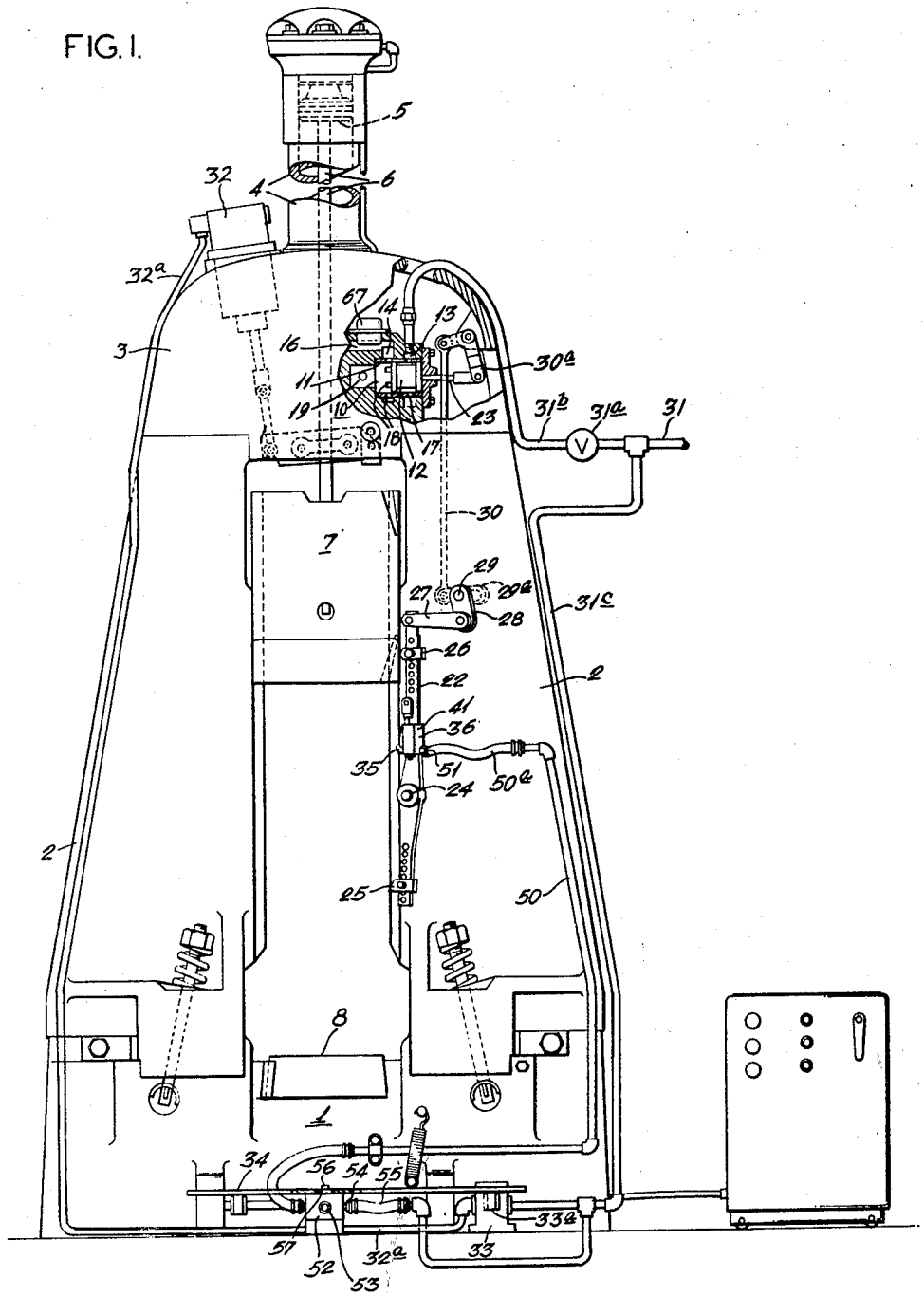
FIG. 1 is a front elevational view partly in section of the drop hammer together with a cabinet for controls and circuitry of the control system of the present invention.

The present invention has application to impacters of all types including, for example, horizontal ram impacters and drop hammers. Referring particularly to FIG. 1, the present invention is shown in conjunction with a fluid pressure operated drop hammer comprising the usual base 1, relatively spaced apart side frames 2 and a head or upper housing 3 which mounts a vertically arranged cylinder 4 for containing a piston 5. Piston rod 6 has its upper end connected to the piston 5 and its other end is connected to a ram 7 which is mounted for vertical reciprocatory movement between the side frames 2 and adapted, when dropped, to cooperatively engage the usual anvil 8 supported upon the base 1 of the apparatus.

In accordance with the practice usually employed in pressure fluid operated drop hammers, the ram 7 is adapted to drop freely by gravity from the elevated position shown in FIG. 1 downwardly into impact engagement with the anvil 8, and pressure fluid admitted to the cylinder 4 below the piston 5 is utilized to return or raise the latter and ram 7 to the elevated position after each drop.

The elastic pressure fluid utilized to actuate the ram lift piston 5 is under the control of a main valve 10. The valve 10 comprises a cylindrical sleeve member 11 which is mounted horizontally in the head or upper housing 3 of the machine and has a valve element 12 slidable therein. Formed in the housing 3 and surrounding the valve sleeve 11 in axially spaced relation thereto are manifolds 13 and 14 respectively, the former being arranged to receive pressure fluid from a fluid supply while the latter is in open communication with the lower end of the lift cylinder 4 through a passage 16.

Communication from the fluid pressure manifold 13 to the interior of the valve 12 is provided by ports 17 in the sleeve 11, while communication from the valve element to the cylinder manifold 14 is provided by other ports 18 in said sleeve. The inner end of the valve sleeve 11 is in open communication with an exhaust port 19 provided in the housing 3 and opening to the atmosphere at the rear of the drop hammer.

Actuation of the valve element 12 is effected by means of a control lever 22 disposed for actuation by the ram 7 and suitably connected to a valve rod 23. The control lever 22, constructed as shown in the drawings, is pivotally mounted intermediate its ends upon a pin 24 secured to one of the side frames 2 of the machine. Adjustably secured to the control lever 22 are dogs 25 and 26, respectively, which are arranged to be engaged by the ram 7 in the manner and sequence hereinafter set forth.

The upper end of the lever 22 is pivotally connected to the inner end of a link 27 which has its outer end pivotally connected to an arm 28 fixed on a pin 29 mounted in the side frame 2 and having an arm 29a fixed on its other end. The arm 29a, in turn, is pivotally connected to the lower end of a vertically extending rod 30, the upper end of which is connected to one arm of a bell crank 30a which has its other arm pivotally connected to the aforesaid actuating rod 23 of the valve element.

The construction and arrangement of the lever 22 and the connections therefrom to the valve rod 23 are such that upon engagement of the lowermost dog 25 by the ram 7 during descent thereof, the lever 22 is actuated in the counterclockwise direction with respect to FIG. 1 to thereby cause the valve element 12 to be shifted to the left from the position shown and establish communication through the valve from the manifold 13 to the manifold 14 so that pressure fluid is admitted to the lift cylinder 4 causing the piston 5 and ram 7 to be actuated upwardly. Following this, and in normal operation of the drop hammer, upon engagement of the upper dog 26 by the ram 7 during its upward movement, the lever 22 is actuated in the clockwise direction resulting in shifting of the valve 12 back into the position shown, thus interrupting flow of pressure fluid to the cylinder 4 and exhausting fluid previously admitted to said cylinder to the atmosphere through the exhaust port 19.

A suitable elastic fluid under pressure is supplied to the main valve 10 from a main pressure fluid supply line 31 through the throttle valve 31a and a supply line 31b. A part of this fluid is to flow through a pipe 31c, control valve 33 and stroke control valve 52 to a clamp release cylinder 32 by way of line 32a. The valve 33 has an operating lever 33a which is actuated by a treadle 34 which, when depressed, actuates the valve 33 to admit fluid under pressure to the pipe 32a resulting in actuation of such clamp release mechanism 32 to allow the ram 7 to drop.

As previously stated, the full stroke of the ram 7 is controlled by the dogs 25 and 26 on the lever 22. Short strokes are made possible by the same mechanism with the addition of the apparatus associated with dog member 35. There is provided on the control lever 22 between dogs 25 and 26 thereof, a fluid control member 36 whereby dog 35 may be projected into the path of the ram for engagement thereby to close the valve 10 and arrest upward movement of the ram 7 at a point a selected distance below the upper limit of its normal stroke so that the length of the succeeding drop stroke of the ram is materially shortened or reduced in length. The construction and arrangement of the movable dog 35 is such that when the fluid control member 36 acts upon it, the dog 35 is so disposed that its nose is projected into the path of the ram 7 for engagement thereby during its upward movement. On the other hand, when the fluid control member 36 does not act upon it, the dog 35 automatically moves to such a position that its nose portion is removed from the path of the ram 7 so that the dog 35 is not engaged by the ram during its upward movement. Actuation of the control member 36 with respect to the lever 22 and dog 35 is accomplished by means of a pressure fluid operated piston in a manner described in U.S. Patent No. 2,604,071 to Paul A. Rickrode. For present purposes it is sufficient to note that when fluid under sufficient pressure is admitted to the cylinder of the fluid control member 36 the dog 35 is thereby actuated to position its nose portion into the path of upward movement of the ram 7.

Pressure fluid is supplied to the fluid control member 36 to urge the dog 35 against a spring effect into the path of the ram 7 by means of a pipe system 50, including a flexible portion 50a, which is connected at one end to the cylinder portion of fluid control member 36 as indicated at 51 and has its other end connected to the outlet of a three-way valve 52 having an exhaust 53 opening to the atmosphere and an inlet 54 connected by a flexible hose 55 to the main pressure fluid supply line. In the present instance the valve 52 is operated by a spring mounted plunger 56 and the construction and arrangement of the valve 52 is such that when the plunger 56 is depressed, the valve is actuated to open and cause fluid under pressure to flow from the connection 55 through the pipe line 50 to the fluid control member 36. On the other hand, when the operating plunger 56 is released, the valve 52 is closed and communication is established from the pipe line 50 to the exhaust port 53 so that fluid in the fluid control member 36 is exhausted to the atmosphere.

In the illustrated embodiment of the present invention the valve 52 is mounted at the underside of the main operating treadle 34 of the machine and the valve plunger 56 projects upwardly through an opening 57 in the treadle as shown in FIG. 1 of the drawings. This arrangement affords the operator great convenience in "manual" operation of the hammer. Simply by changing the position of his foot on the treadle 34 he is able to establish pressure fluid flow solely to the clamp release mechanism of the machine or simultaneously to both the said release mechanism and the adjustable dog fluid control member 36 at will as may be desired.

Heretofore in a typical forging operation of the drop hammer, the operator had to learn the pattern of blows determined to be best for that particular forging. Typically, the operator might make the first few blows of the operation with the ram operating through its full stroke simply by depressing the main foot treadle 34 of the machine and the remaining blows of the operation by a shorter stroke of the ram 7 simply by shifting his foot on the treadle 34 so that in the act of depressing the latter he also depressed the plunger 56 to open valve 52 and thereby admit pressure fluid to the fluid control member 36 causing the dog 35 to be projected into the path of the ram 7, thus causing the ram to operate through a stroke of substantially reduced length. With simple stroke patterns, there was little difficulty in remembering and performing the strokes in correct sequence. As patterns have become longer and more complex, however, particularly in those cases where the desirability of more than two stroke lengths has increased, the difficulty in correctly repeating the stroke program has increased. Even in connection with simple stroke programs, however, the desirability of the programmed control system of the present invention will be apparent. Such a system lends itself to becoming part of a completely automatic control of the impact device should that become desirable.

Figure 2:
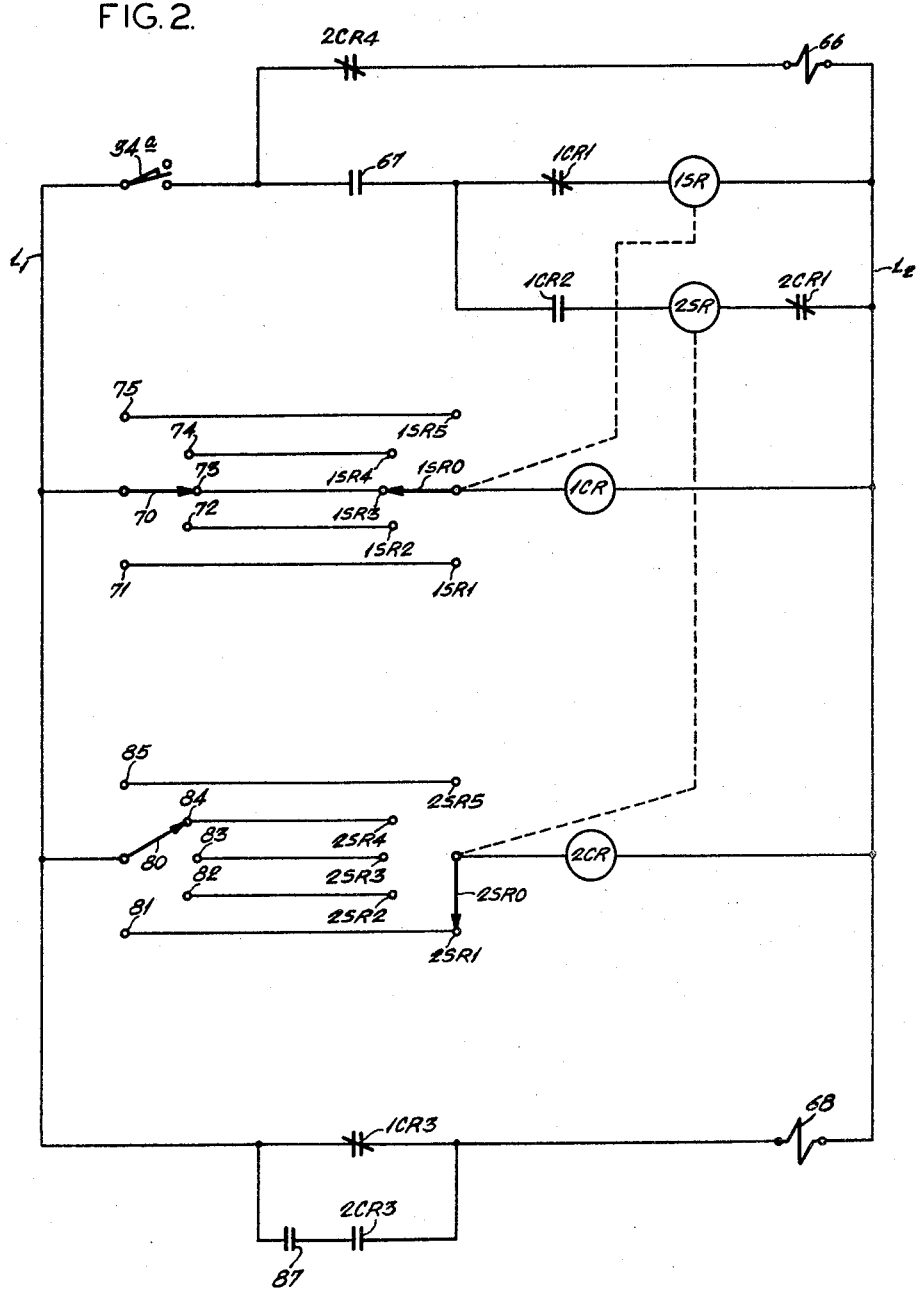
FIG. 2 is a simplified schematic circuit diagram illustrating the primary components of the system and their coaction.

A control circuit highly simplified for the purpose of clarity is shown in FIG. 2 to illustrate a preferred embodiment of the present invention. In this specific embodiment after an initial long stroke, the hammer will automatically provide a series of short strokes of preselected number followed by a series of long strokes of preselected number and may terminate in a single short "cut-off" stroke, if desired. The elements shown in FIG. 2 are related to the structure in FIG. 1 through a treadle switch 34a associated with and operated by treadle 34, and pressure switch 67 associated with the pressure system. Short stroke selector solenoid 68 in automatic operation functionally replaces actuator 56. The clamp which engages rod 6 and holds ram 7 elevated and its clamp release solenoid 66 can be seen in FIG. 1 in dashed lines.

This particular arrangement employs a pair of stepping relays 1SR and 2SR each having a plurality of fixed contacts and an associated or driven moving contact which is driven step by step sequentially from one fixed contact to the next. Means is also provided whereby a particular fixed contact of the stepping relay may be selectively connected into a circuit through the movable contact to a control relay which initiates the next step of the sequence. In FIG. 2, for example, as the treadle 34 is depressed, the clamp release solenoid 66 is energized through switch 34a, thereby releasing the clamp and allowing the ram to fall under gravity. The fall of the ram and actuation of dog 25, as previously described will position valves in the fluid system in the manner described to raise the ram by supplying fluid to cylinder 4. As pressure increases, pressure switch 67 is closed and stepping relay 1SR is energized through the normally closed contact 1CR1 of control relay 1CR. Stepping relay 1SR drives movable contact or brush 1SR0 clockwise from one fixed contact to the next in the predetermined sequence 1SR1, 1SR2, 1SR3, 1SR4 and 1SR5 each time pressure switch 67 is closed. These fixed contacts are connected to fixed contacts 71, 72, 73, 74 and 75 and movable selector switch contact 70 is positioned at the desired contact which will allow a certain number of strokes to occur before changing the position by energizing control relay 1CR. Short stroke solenoid 68 is connected across power $L_1$ and $L_2$ through normally closed contacts 1CR3 of relay 1CR. Therefore, as the ram is allowed to fall by energization of clamp release solenoid 66, the dog 35 will be moved into position to stop the rise of the ram 7 in its short stroke position and this will continue until relay 1CR is energized. Here since movable selector switch contact 70 is set on fixed contact 73, relay 1CR will be energized when movable relay contact 1SR0 reaches fixed relay contact 1SR3.

Once relay 1CR is energized, the normally closed contacts 1CR3 in series with short stroke solenoid 68 will be opened thereby causing dog 35 to be retracted by its loading spring so that the ram 7 can rise to contact long stroke dog 26. The energization of relay 1CR will also open normally closed contacts 1CR1 thereby deenergizing stepping relay 1SR and close contacts 1CR2 thereby energizing stepping relay 2SR through normally closed relay contacts 2CR1. As will be discussed hereafter in connection with FIG. 3 more elaborate circuitry is required in a practical system in order to permit proper sequencing and full cycling.

Each time pressure switch 67 is closed stepping relay 2SR drives movable contact 2SR0 from one fixed contact to another, i.e., 2SR1, 2SR2, 2SR3, 2SR4 and 2SR5 until it reaches the contact which is connected by movable selector switch contact 80 through a fixed contact 81, 82, 83, 84 or 85 of the selector switch. In this case selector switch contact 80 is placed on fixed contact 84 so that when movable relay contact 2SR0 reaches contact 2SR4 the circuit from line $L_1$ to line $L_2$ through control relay 2CR will be completed. At that time, normally closed contacts 2CR1 will be opened stopping stepping relay 2SR and normally open contacts 2CR3 will be closed so that if switch 87 has been previously manually closed, a final or "cut-off" short stroke will be provided by energization of short stroke solenoid 68. In the circuit shown in FIG. 2, even if treadle 34 remains depressed after the sequence has terminated, the contacts 2CR4 will open clamping the ram in the raised position.

Figure 3:
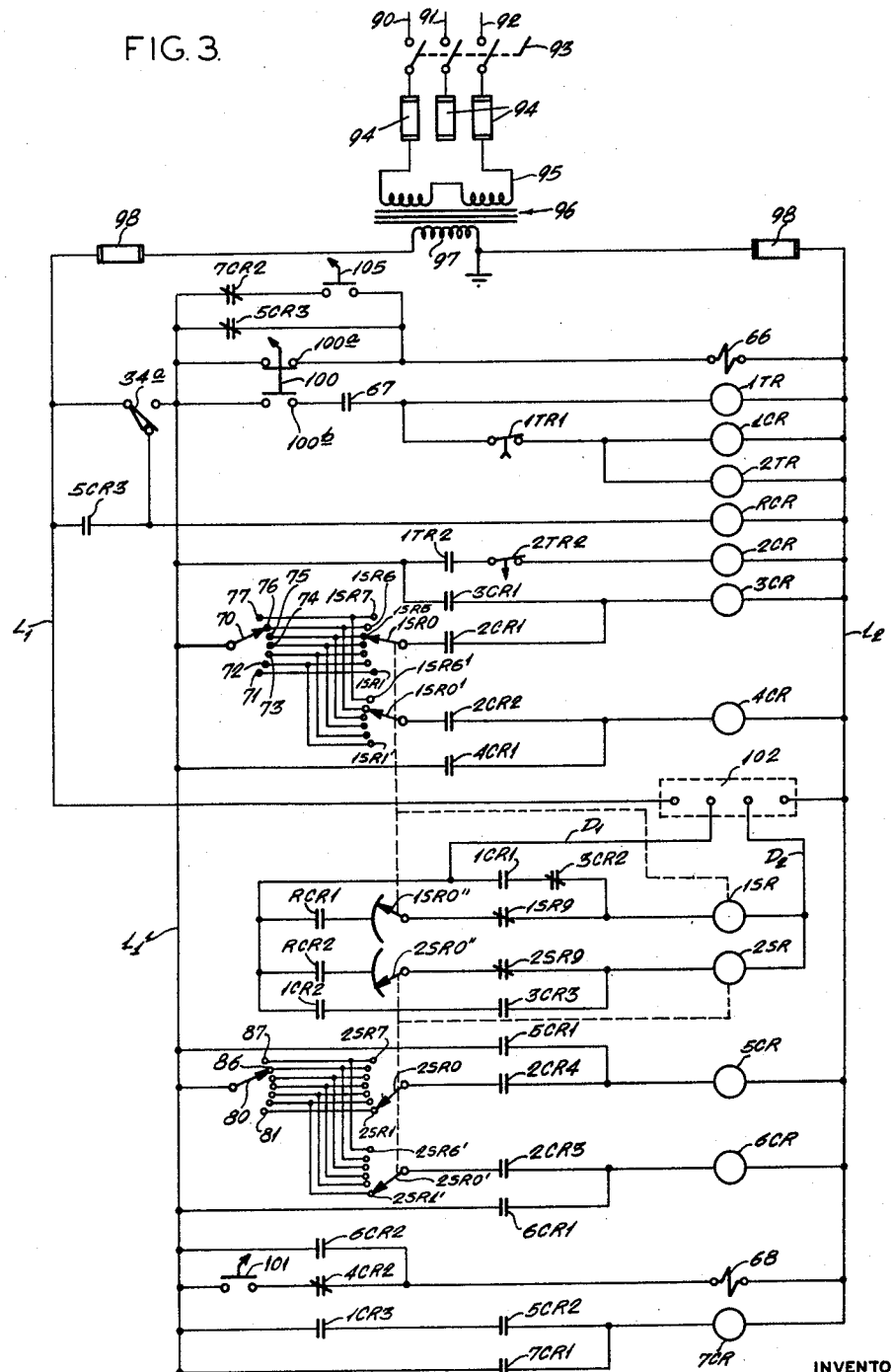
FIG. 3 is a more complete circuit diagram of a practical system for the system shown in simplified form in FIG. 2.

FIG. 3 is supplied in order to show in detail the nature of the circuitry which is necessary to make the arrangement of FIG. 2 practical. As shown, the three-phase lines 90, 91 and 92 are connected through a power switch 93 and individual fuses 94 to the primary 95 of a transformer 96. The secondary 97 of the transformer 96 is connected through individual fuses 98 to the lines $L_1$ and $L_2$. The clamp release solenoid 66 may be energized by connecting it across lines $L_1$ and $L_2$ by closing the switch 34a to the open contact shown in FIG. 3 which is done by depressing the treadle 34. Also by closing switch 34a, the potential on line $L_1$ is applied to line $L_1'$. In this case a D.C. power supply 102 from which D.C. power lines $D_1$ and $D_2$ are taken is provided and connected across A.C. power lines $L_1$ and $L_2$.

If switch 100 were in the position shown, each time the treadle is depressed the clamp release solenoid 66 would be energized and would continue to be energized as long as the treadle is depressed to permit the ram to provide continuous blows. By provision of switch 101 with these contacts in the position shown, the blows would all be long but if the position of the switch 100 were changed to close contacts 100b to put the device on an automatic operation basis, switch 101 would also be closed to function in a way presently to be described.

If switch contacts 100b were closed, and contacts 100a opened, and the treadle 34 were depressed, the clamp release solenoid would immediately be energized through contact 5CR3 and would remain energized until these contacts were open. As soon as the ram reached the bottom of its stroke, pressure switch 67 would close connecting time delay relay 1TR across the power lines $L_1$, and $L_2$. Control relay 1CR and time delay relay 2TR are connected in parallel with each other and in series with contacts 1TR1 across the power lines. Relays 1CR and 2TR, however, are subject to interruption after a predetermined time as the time delay relay contacts 1TR1 open.

When relay 1TR is energized it will tend to open normally closed switch 1TR1 after a delay of a predetermined time. Meantime, relays 1CR and 2TR will be energized. The energizing of 1TR closes normally open switch 1TR2 in series with switch 2TR2 which is arranged to be normally closed but delays closing a predetermined time after being deenergized to avoid passing current while movable relay contact 1SR0 is switching. Thus the closing of relay 2CR contacts is delayed through switch 2TR2 until switching is completed. Switch 1TR1 being initially closed upon energization of relay 1TR allows control relay 1CR to actuate its switches immediately. For example, normally open switch 1CR1 is closed upon energization of relay 1CR in series with normally closed switch 3CR2 so that stepping relay 1SR will be energized by connection across D.C. lines $D_1$ and $D_2$. Upon being energized, stepping relay 1SR sets moving contacts 1SR0, 1SR0' and 1SR0'' by means of a pawl and ratchet arrangement. Then immediately upon its deenergization when delayed opening switch 1TR1 opens thereby deenergizing relay 1CR and opening its switch 1CR1 the pawl is in position to actuate the ratchet and move the movable contacts one position. The movable contacts are preferably separate arms on a single shaft to which the arms are rigidly radially affixed. The movable contacts are preferably insulated from one another and are so arranged that, while movable contacts 1SR0 and 1SR0' contact similar fixed contacts, corresponding ones of which are electrically connected together and designated by similar primed and unprimed number designators. The fixed contacts on the unprimed level of the stepping relay are wired to the fixed contacts of the primed level in such a way as to energize a relay connected to the primed movable contact one step ahead of a relay connected to the unprimed movable contact. Each time pressure switch 67 is closed, the movable contacts of stepping relay 1SR are advanced one fixed contact. Movable contact 1SR0' will reach contact 1SR5' and complete a circuit from line $L_1'$ through movable selector switch contact 70, fixed contact 76 and normally open control relay switch 2CR2 to energize control relay 4CR which immediately closes normally open switch 4CR1 in a holding circuit through that switch and the winding of relay 4CR across lines $L_1'$ and $L_2$. On the next step of the movement of relay 1SR, the contact 1SR0 will contact fixed contact 1SR6, thus completing a circuit from line $L_1'$ through selector 70, fixed contact 76, the contacts of relay 1SR, normally open contact 2CR1 then closed due to energization of relay 2CR when switch 67 is closed as previously indicated, and control relay 3CR to line $L_2$. Energization of control relay 3CR causes normally open switch contacts 3CR1 to close and operate as holding switch contacts in series with relay 3CR across lines $L_1'$ and $L_2$.

Short stroke solenoid 68 is normally energized across lines $L_1'$ and $L_2$ through switch 101 and normally closed switch contacts 4CR2 of control relay 4CR. When control relay 4CR is energized, however, these normally closed contacts are opened, the short stroke solenoid 68 is deenergized and the pattern of short strokes is set to be terminated after the next stroke which will be short because the dog 35 cannot be withdrawn from the ram path in time to avoid the upwardly moving ram 7 on that particular stroke. This is because the pressure switch 67 is actuated by pressure increase as the ram starts to rise and time limitations in the equipment are too short and the time constants too long to permit immediate withdrawal. However, provision of relay 4CR in the primed system or in series with movable brush 1SR0 enables its energization one stroke ahead of the last stroke to be counted so that it can anticipate the counting of the last stroke. It does so and deenergizes short stroke solenoid 68 by opening contacts 4CR2. Then, on the next stroke of the ram with the energization of relay 3CR, the stepping relay 1SR is deenergized by the opening of the normally closed contacts 3CR2 and the stepping relay 2SR is energized by the closing of the normally open contacts 3CR3 which energize relay 2SR by connecting it through normally open contacts 1CR2 between lines $D_1$ and $D_2$. Relay 1CR is energized to close switch contacts 1CR2 when pressure switch 67 is closed. Contacts 3CR3 remain closed once relay 3CR is energized because of the action of holding contacts 3CR1.

Like stepping relay 1SR, stepping relay 2SR has three movable contacts 2SR0, 2SR0' and 2SR0'' and fixed contacts 2SR1–2SR7 and 2SR1'–2SR7'. The primed and unprimed movable contacts have the same relative relationships to one another as do the movable primed and unprimed contacts of stepping relay 1SR. Again, a movable selector switch 80 enables a circuit connection eventually through a selected one of certain fixed contacts here shown as 81, 82, 83, 84, 85, 86 and 87. Control relay 6CR will be energized when contact 2SR0' reaches contact 2SR6' in the arrangement shown and pressure switch 67 results in the closing of normally open switch 2CR3. Energization of control relay 6CR closes normally open holding switch contacts 6CR1 to place relay 6CR in series with it across lines $L_1$, and $L_2$. Meanwhile full length strokes are continued. One stroke later, contact 2SR will close completing the circuit from $L_1'$ through movable switch arm 80, fixed contact 86, fixed contact 2SR6, movable contact 2SR0, normally open switch 2CR4 which is closed by virtue of energization of relay 2CR, and relay 5CR to line $L_2$. Completion of circuit through relay 5CR closes the contacts of holding switch 5CR1 which is in series with relay 5CR across the lines $L_1'$ and $L_2$. Thus, despite alternate closing and opening of switch 2CR4, relay 5CR will remain energized.

Closing of switch 6CR energizes short stroke solenoid 68 across lines $L_1'$ and $L_2$ through normally open switch contacts 6CR2 so that following the final long stroke below, the dog 35 may be interposed in the path of ram 7 to cause a single short stroke. Upon the energizing of relay 5CR, normally open switch 5CR2 in series with normally open switch 1CR3, which closes each time pressure switch 67 is actuated, will cause energization of relay 7CR. This will cause holding switch 7CR1 to close connecting relay 7CR across lines $L_1'$ and $L_2$ regardless of whether switches 1CR3 and 5CR2 are opened or remain closed. It will also open normally closed switch 7CR2 which, if the switch 105 for manually selecting a final cut-off blow is closed, will enable interruption and deenergization of the clamp release solenoid after the final cut-off blow. However, if the switch 105 is open, it will prevent energization of the clamp release solenoid and cause the cycle to terminate without a final cut-off blow inasmuch as switch 5CR3 has opened. Relay 5CR also closes switch 5CR4 through reset relay RCR which through switches RCR1 and RCR2, thereby, closes the D.C. circuit through the reset brushes 1SR0'' and 2SR0'' and through normally closed stepping relay contacts 1SR9 and 2SR9 to continuously energize the stepping relays 1SR and 2SR until they are driven back to their starting position.

It should also be observed that if treadle 34 is released in the course of operation, its switch 34a will open the circuit through the pressure switch and close a circuit across lines $L_1$ and $L_2$ through the reset relay RCR. Also when the treadle switch is opened by release of the treadle, all of the circuits through the holding switches will be deenergized allowing the relays to drop out and interrupting the forging cycle with the ram in striking position. The forging cycle can be initiated again by the sequence previously described. The fact that both of the relay switches 5CR3 and 7CR2 are opened will insure that the cycle will not repeat if the treadle is kept depressed and the treadle switch 34 is closed. Therefore, in order to initiate a new sequence of blows, the treadle switch must be released, reset and reclosed.

Figure 4:
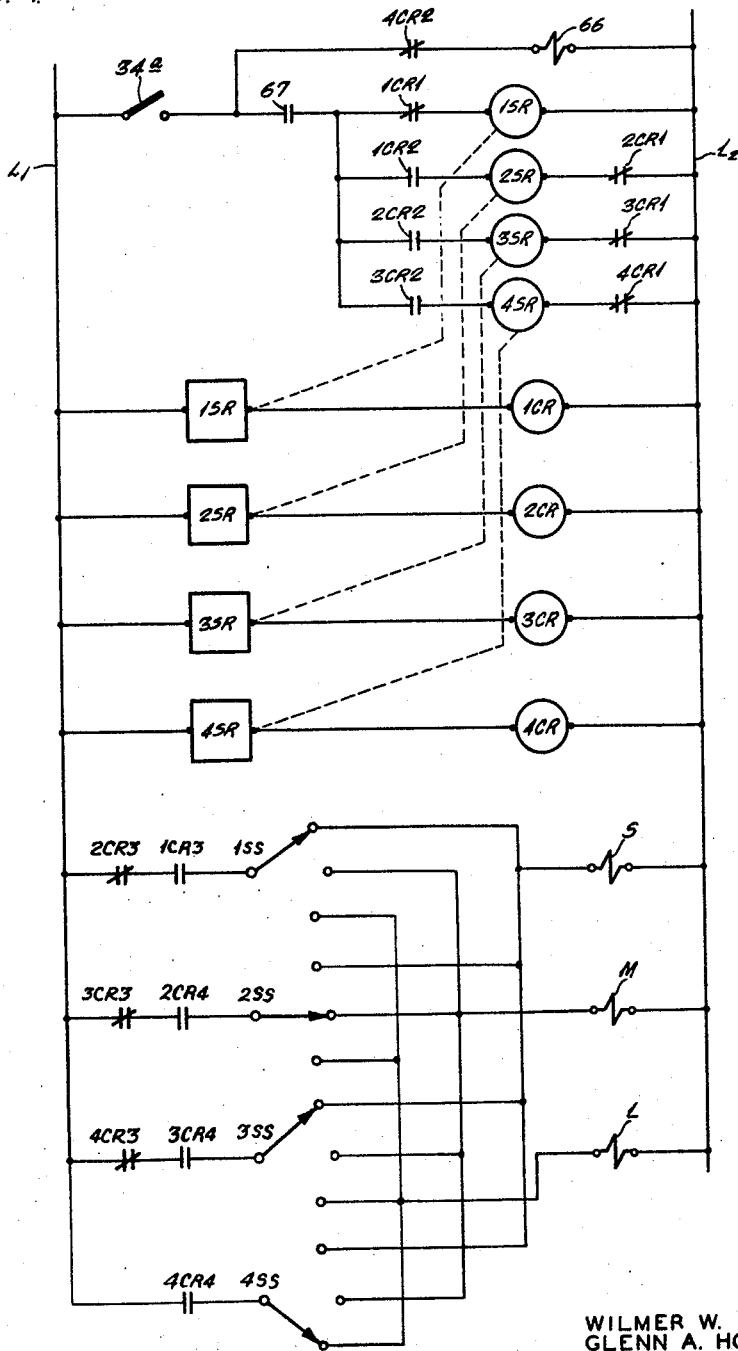
FIG. 4 is another simplified circuit diagram showing means for programming and controlling more than two stroke lengths the sequence of which may be varied.

In many instances, it may be desirable either to vary the pattern of ram blow sequences or to have more than just two stroke lengths. The system of FIG. 4 shows electrically how a system with three stroke lengths might be employed. A minimum stroke length would be set up in the same way that a short stroke length is set up but by means of a separate solenoid corresponding to 68 in FIGS. 2 and 3 actuating a separate dog corresponding to dog 35 but at the appropriate intermediate level. It may also be desirable to vary the sequence of the groups from time to time, and the system of FIG. 4 permits this to be done.

Referring more specifically to FIG. 4, it will be observed that the circuit shown is even more schematic than FIG. 2 and that the contacts of the stepping relay and the selector switches have been lumped into boxes which for convenience have been given the same number designator as the relay by which they are controlled. The lines $L_1$ and $L_2$, the treadle switch 34a, the pressure switch 67 and the clamp release solenoid 66 correspond to those in FIG. 2. Instead of a single short stroke solenoid 68, there is a short stroke solenoid S and a medium stroke solenoid M provided. Use of a retractable long stroke solenoid L is also suggested although it is not necessary in a system providing three stroke lengths.

In the circuit illustrated, four stepping relays 1SR, 2SR, 3SR and 4SR are employed. The prefix number before the stepping relay indicates the sequence of actuation of these relays. The relays are arranged in parallel circuits in series with the pressure switch 67. The control relays are so arranged that the stepping relays will cause them to be energized in the sequence of their prefix numbers. Thus it will be seen that 1SR is first energized through the normally closed switch contacts 1CR1 of control relay 1CR. At the same time, other stepping relays have open switches in series with them. Relay 1SR will continue to be energized until it completes a circuit through the selector switch contacts to complete the circuit through control relay 1CR which will thus open the normally closed contacts of switch 1CR1 and close the normally open contacts of switch 1CR2 associated with the relay. Relay 1CR will also close the normally open contacts of switches 1CR3.

In similar fashion, after the stepping relay 2SR has reached its selected position, relay 2CR will be energized thus opening normally closed contacts 2CR1 and thereby deenergizing relay 2SR and closing normally open contacts of switch 2CR2, thereby energizing stepping relay 3SR through the normally closed contacts of switch 3CR1. This process is continued through relay 4SR which when it closes to the selected contact may open normally closed contacts 4CR2 which are in series with the clamp release solenoid 66, thereby causing the ram to be clamped on the last move upward.

The length of the strokes are, of course, obtained by the stroke length selection means and the stroke length solenoids S, M and L. Actually, the stroke of solenoid L may not be employed just as no similar solenoid may be employed in the FIG. 2 arrangement. Selector switches designated 1SS, 2SS, 3SS, 4SS by their gang connections, all have contacts which may be opened and closed in series with any one of the stroke length selector solenoids S, M or L, but only one solenoid is energized by each selector switch. The selector switches are selected in a particular sequence because of the arrangement of control relays which in turn are sequentially energized by their associated stepping relays.

Figure 7:
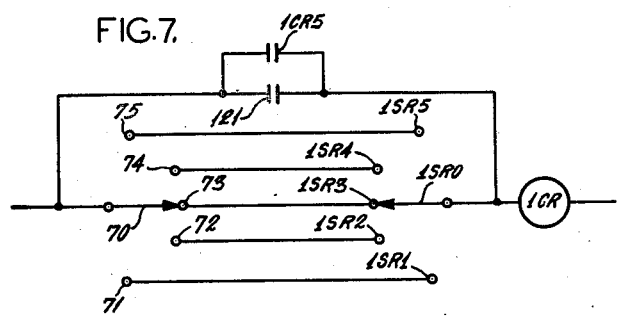
FIG. 7 is a detail from the circuit diagram of FIG. 3 showing how a program may be changed by events occurring in the course of the impacting.

In many instances the particular setting of the number of strokes of a given stroke length cannot be done strictly on the matter of experience since the optimum number of strokes will depend upon one or more variables. Perhaps the most common variable is the temperature variable since as a general rule the hotter the work piece the fewer number of blows required for a particular degree of deformation. Such variables can usually be detected in advance of the forging of each piece to be worked and by employing sensing means in advance of the impacter the program may be set automatically in a system similar to that shown in FIG. 5. On the other hand in some instances it may be desirable to terminate a particular sequence of blows after a certain amount of deformation has occurred or when the work piece provides a certain amount of resistance to impact. In such event a circuit such as FIG. 2 may be modified as shown in FIG. 7 and the information sensed by means such as those shown in FIGS. 8 and 9.

Figure 6:
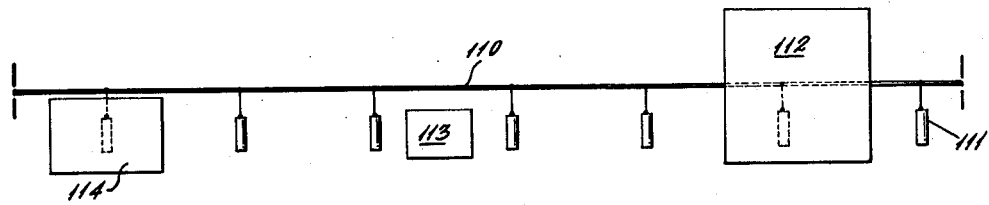
FIG. 6 is a schematic diagram showing how temperature or other sensing means may be accomplished.

Referring to FIG. 6 the block diagram illustrated represents a production line whereby billets to be forged are loaded on a conveyor 110 at a position 111 prior to entering a furnace 112 in which they are heated. The heated billets are continuously moved by the conveyor 110 past heat sensing means 113 which detects the temperature of a billet just before it is moved to the impacter 114. The temperature sensed by apparatus 113 in turn determines the particular number of blows of a particular length or possibly of each length.

Figure 5:
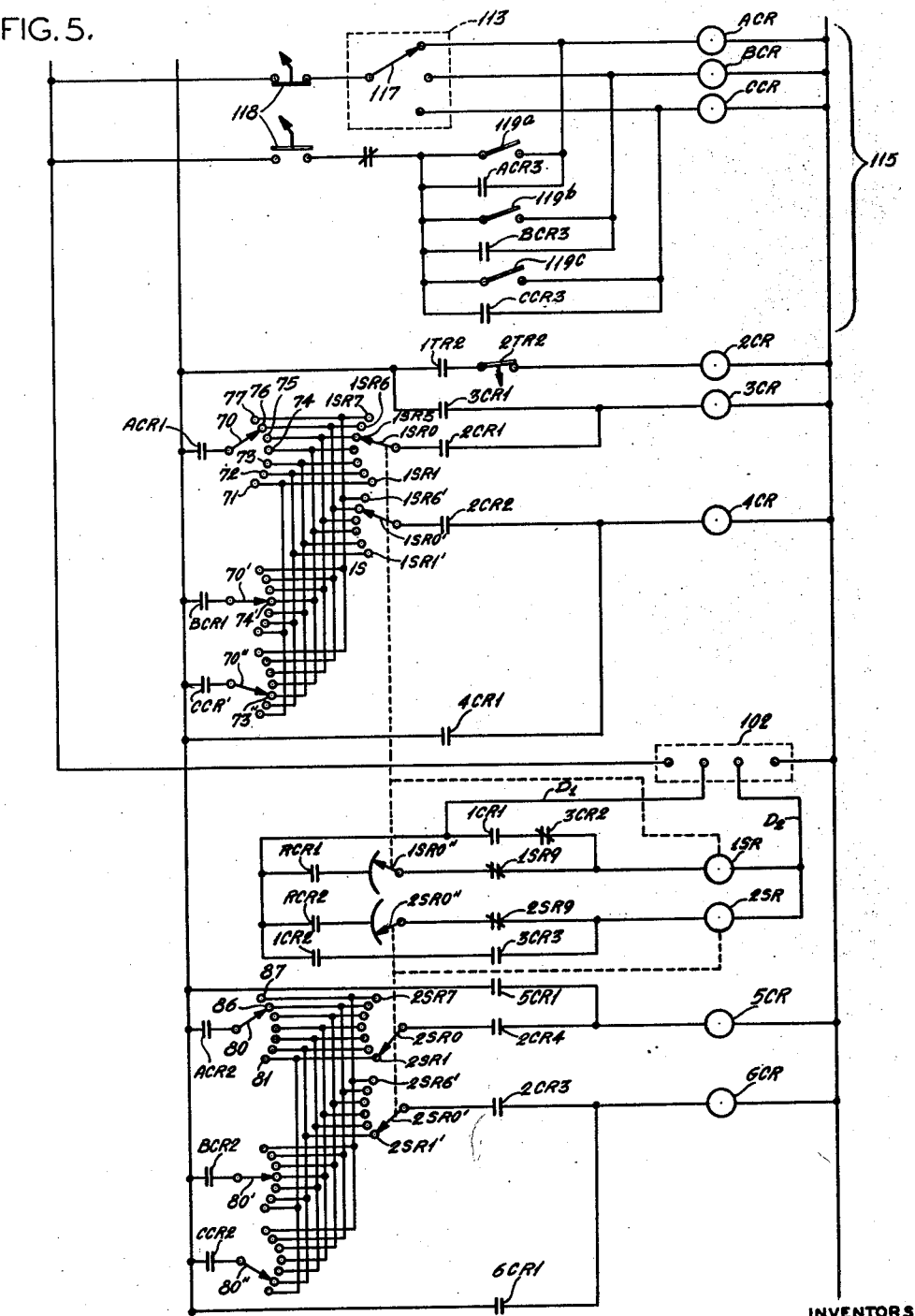
FIG. 5 is a circuit diagram of part of a circuit similar to FIG. 3 having a modified system employing a sensing technique to vary stroke length.

FIG. 5 is a circuit embodying the sensing means of FIG. 6. In most respects the circuit is similar to that of FIG. 3 and corresponding members are numbered using the same numbers as employed in FIG. 3. In addition, however, a new relay section 115 is employed. Additionally, alternative selector switches are provided in parallel with switches 70 and 80 and provided with switches which permit them to be alternatively selected through the relays in the circuit portion 115, which adds relays ACR, BCR and CCR to the system of FIG. 3. These relays may be automatically selected by the program selector switch 117 which is part of the temperature sensing means 113. When the manual automatic switch 118 is closed, as shown in FIG. 5, the switch position of switch 117, which in turn is dependent upon the temperature sensed, will determine which of the relays ACR, BCR or CCR is energized. ACR in the diagram is shown to be energized through switch 117 and this in turn completes the circuit through switch 70. Consequently when moving contact 1SR0 of the stepping relay reaches the fixed contact 1SR6 the circuit is closed through relay 3CR by switch 70 set at contact 76. Contact ACR2 operates similarly with switch 80. Had the temperature been sufficiently hotter, the switch 117 would have completed the circuit through relay BCR thereby closing switch BCR1 and making effective switch 70' which is closed to fixed contact 74'. In this event two less blows would be struck. If the temperature were even hotter yet, switch 117 might have been connected through relay CCR thereby energizing switch CCR1 to close it through switch 70'' through fixed contact 73", thereby permitting three blows less than in the case where relay ACR is energized.

Switches BCR2 and CCR2 connect selection switches 80' and 80", respectively, in circuit to reduce the number of second sequence blows in accordance with the temperature selection. It will be appreciated that instead of the same relays separate relays could be used for switches 80, 80' and 80" but this duplication in most cases is unnecessary.

It is also possible to convert the arrangement of FIG. 5 to manual preselected operation by closing the open contacts of switch 118 and opening the closed contacts of that switch. In this event manually set switches 119a, 119b or 119c may be selectively closed so that, regardless of temperature, the number of blows programmed by switch 70 will be performed if switch 119a is closed. The number of blows programmed by switch 70' will be imposed if switch 119b is closed and the number of blows programmed by switch 70'' will be imposed if switch 119c is closed. Relay switch contacts ACR3, BCR3 and CCR3 will act as self-holding contacts in the event that switches 119a, 119b and 119c are of a push-button instantaneous closed type.

The operation of the circuit of FIG. 5 is essentially like that of FIG. 3 in respects other than those described.

While presensing of temperature or other effects as suggested by the system of FIG. 6 may be most desirable there will be occasions in which it is difficult to predetect what the effects of the sequential blows might be. For example, where deformation proceeds to a certain amount before the number of blows of a particular sequence has been provided it may be desirable to terminate the sequence. This can be done by use of sensing means to sense the condition at the time it exists and to close a switch short circuiting the stepping relay. This general type of arrangement is suggested by FIG. 7 which may be visualized as a part of the circuit of FIG. 2, for example, wherein corresponding number designators have been used on corresponding parts. In FIGS. 7, for example, a switch 121, which is closed upon determination of some predetermined physical condition, short circuits switch 70 and stepping switch 1SR and energizes relay 1CR. If desirable, this may close holding contacts 1CR5 in parallel with switch 121, but, in any event, as a result of closing of contacts 1CR3 (see FIG. 2) the stepping relay 2SR will be actuated.

Figure 8:
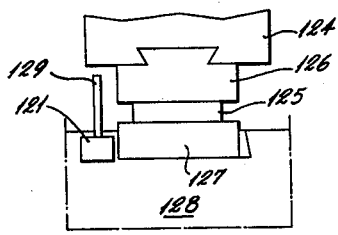
FIG. 8 is a schematic diagram representing a sensing means which might be employed with the circuit of FIG. 7.

FIG. 8 represents in a highly schematic form a drop hammer 124 acting on a work piece 125 between a die 126 on the hammer and a die 127 fixed to the base 128. Also fixed to the base is an actuator 129 projecting toward the hammer 124 in such a way that when the work piece 125 is deformed more than a certain amount the hammer will contact actuator 129 which will operate as switch 121 corresponding to switch 121 of FIG. 7.

transformer 135 which, in turn actuates the switch 121.

Figure 9:
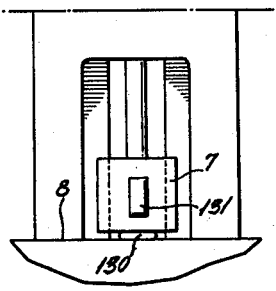
FIG. 9 shows one possible means of sensing resistance to impact in a drop hammer.
Figure 9A:
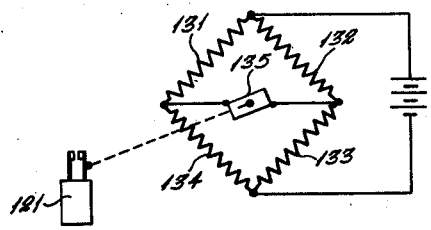
FIG. 9a shows a circuit arrangement in which the strain gauge of FIG. 9 may be employed.

A modified arrangement is possible in a drop hammer such as that shown in FIG. 9. The impacter 7 acting upon the workpiece 130 between it and the base 8 may encounter a high degree of resistance as the piece is deformed and becomes hotter. This can be detected by reactive forces at certain locations on the hammer and a suitably mounted strain gauge 131 or pattern of gauges may be used for this purpose. For example, strain gauge 131 may be connected in a bridge shown in FIG. 9a with other resistors 132, 133 and 134 to operate a differential transformer 135 which, in turn, actuates the switch 121.

Figure 10:
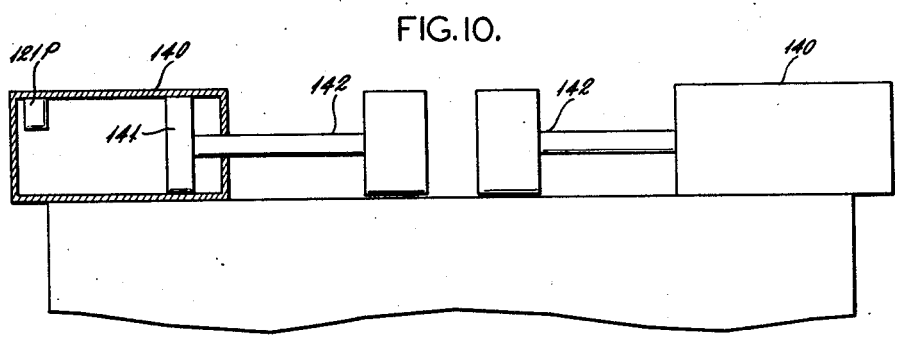
FIG. 10 illustrates a double ram horizontal impacter employing an alternative work resistance sensing arrangement.

A pressure switch 121p similar to pressure switch 67 of FIG. 1 may also be used to determine resistance to impact. As shown in FIG. 10 such a switch may be employed within the fluid in cylinder 140 actuating the piston 141 driving one of the rams 142 of a double ram impacted.

From the above description, it will be seen that by this means it is possible to place strokes of any length in any desired sequence by techniques previously shown, select the number of strokes in each sequential group and by addition of more relays increase the capacity of the programmer either in the direction of permitting more groups of strokes or in the direction of permitting selection of more lengths of strokes. It is also possible to have the number of strokes of a particular length predetermined by a sensing means such as a means sensing the temperature of a work piece. It is likewise possible to have a particular sequence of blows terminated upon the occurrence of a predetermined set of conditions. Preferably all systems are arranged so that blow programs may be interrupted manually or by safety devices or limit switches at any time. It is desirable in such instances to provide means whereby upon continuation the blow program may be maintained or alternatively reset at the discretion of an operator.

It will be appreciated by those skilled in the art that the means illustrated herein are merely by way of example and not by way of limitation. Other means of providing multiple patterns within the spirit of the teaching and the scope of the claims are intended to be within the scope and spirit of the present invention.

This application is a continuation-in-part of United States application Serial No. 94,822, filed March 10, 1961, issued as Patent No. 3,043,271, dated July 10, 1962, for "Control System for Impact Device" by the same inventors.

We claim:

1. A stroke programmer control system for an impact device having means permitting selection of strokes of more than one length comprising at least one means for actuating each of the stroke length selector means, counting means for counting strokes of the impact device, sequencing means responsive to the counting means and associated with at least one less than the total number of actuating means to terminate a sequence of strokes of a particular length at a selected count and initiate a sequence of blows of another predetermined length, and means sensing some property of the work and automatically operating said counting means to actuate the sequencing means at different counts depending on that property.

2. The stroke programmer of claim 1 in which sensing means is a temperature sensing means.

3. A stroke programmer control system for an impact device having means permitting selection of strokes of more than one length comprising at least one means for actuating each of the stroke length selector means, counting means for counting strokes of the impact device, sequencing means responsive to the counting means and associated with at least one less than the total number of actuating means to terminate a sequence of strokes of a particular length at a selected count and initiate a sequence of blows of another predetermined length, and switch means for bypassing the counting means in response to means sensing some property of the work.

4. The stroke programmer of claim 3 in which the sensing means is a limit switch positioned to sense the degree of deformation of the work by position of the impact device.

5. The stroke programmer of claim 3 in which the means sensing the property of the work is a load sensing device mounted on a portion of the impact device which is capable of sensing the resistance encountered in forging the work piece.

6. The stroke programmer of claim 3 in which the sensing means is a pressure sensing device including a pressure pickup in a hydraulic circuit which is used for driving or controlling the stroking member and subjected to pressure increases on impact.

7. A stroke programmer control system for an impact device having means permitting selection of strokes of more than one length comprising at least one means for electrically actuating each of the stroke length selector means, counting means, each counting strokes of a selected length and in the form of a stepping relay arranged across power lines in circuit with one of the means for electrically actuating a stroke length selector means for selecting the length of the next sequence of strokes and having a predetermined number of fixed contacts positioned to be sequentially contacted by the driven contact driven one step at each stroke of the impact device, switch means selectively connecting one of said fixed contacts to one of said power lines to complete a circuit through the actuating means at a count selected by said switch means, and means sensing some property of the work and automatically operating said switch means to actuate the stroke length selector means at different counts depending on that property.

8. The stroke programmer control system of claim 7 in which the switch means consists of a common movable contact and a plurality of fixed contacts each connected to a fixed contact of the stepping relay.

9. The stroke programmer control system of claim 7 in which individual switches in series with each of the fixed contacts of the stepping relay collectively constitute the switch means.

10. A stroke programmer control system for an impact device having means permitting selection of strokes of more than one length comprising at least one means for electrically actuating each of the stroke length selector means, counting means, each counting strokes of a selected length and in the form of a stepping relay arranged across power lines in circuit with one of the means for electrically actuating a stroke length selector means for selecting the length of the next sequence of strokes and having a predetermined number of fixed contacts positioned to be sequentially contacted by the driven contact driven one step at each stroke of the impact device for counting strokes of selected length to complete a circuit through the sequencing means at a count selected by connection of a fixed contact of the stepping relay to one of the power lines, switch means by-passing the counting means, and means sensing some property of the work and automatically operating said switch means to actuate the stroke length selector means upon a predetermined condition of that property.

References Cited in the file of this patent

UNITED STATES PATENTS

| | | |
|---|---|---|
| 1,924,545 | Fitzgerald | Aug. 29, 1933 |
| 2,604,071 | Rickrode | July 22, 1952 |
| 2,766,711 | Dever | Oct. 16, 1956 |
| 2,837,059 | Tomka | June 3, 1958 |